May 4, 1965  A. M. SPERBER  3,181,197
LUBRICATING MEANS FOR HINGES
Filed Dec. 4, 1962  2 Sheets-Sheet 2
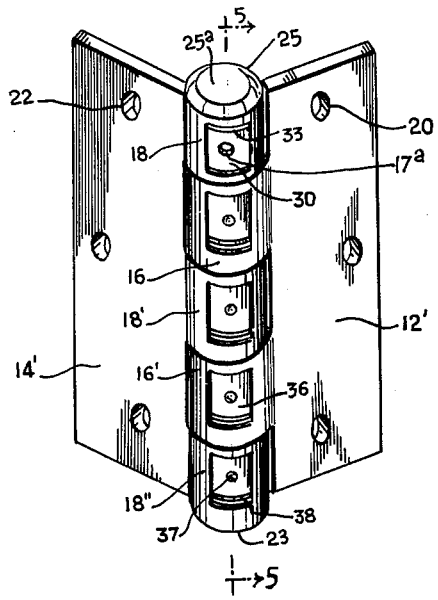
Fig. 4.
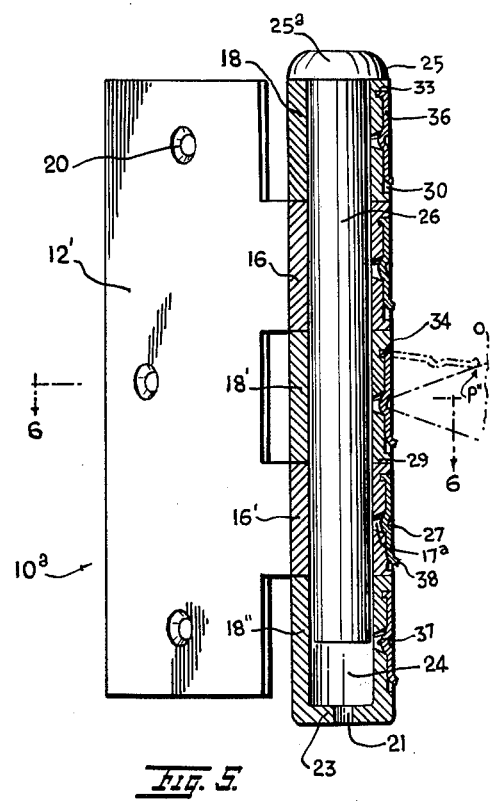
Fig. 5.
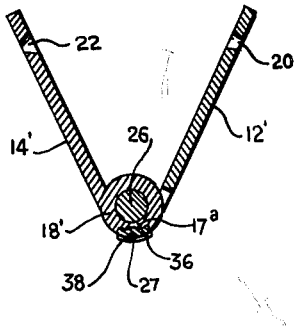
Fig. 6.
Fig. 7.
INVENTOR.
ALBERT M. SPERBER
BY
ATTORNEY

United States Patent Office 3,181,197
Patented May 4, 1965

3,181,197
LUBRICATING MEANS FOR HINGES
Albert M. Sperber, F–14 Bashford Ave., Union, N.J.
Filed Dec. 4, 1962, Ser. No. 242,178
2 Claims. (Cl. 16—161)

This invention relates to the art of hinges for doors, windows and the like and more particularly concerns an improved butt hinge construction with provision for lubricating parts thereof.

According to the invention there is provided a butt hinge having two wing plates provided with interfitting tubular eyes through which passes a pivot bolt. The eyes are provided with holes for applying grease, oil or other lubricant to the interiors of the eyes. The closed bottom end of one eye has a passage through which lubricant can be applied. In one form of the invention the holes are axially inclined to the axes of the eyes to retain the lubricant inside the eyes. In another form of the invention, spring retainers are provided for holding the lubricant in the holes of the eyes and for excluding dust and debris. The invention thus provides improved means for lubricating parts of a butt hinge and for keeping the parts lubricated.

It is therefore a principal object of the invention to provide a butt hinge with improved lubrication means.

Another object is to provide lubrication holes in eyes of wing plates of a butt hinge.

A further object is to provide spring covers for lubrication holes in the eyes of butt hinge plates.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 4 is a side elevational view of another butt hinge according to the invention.

FIG. 5 is a longitudinal sectional view on an enlarged scale taken on line 5—5 of FIG. 4.

FIG. 6 is a cross-sectional view taken on line 6—6 of FIG. 5.

FIG. 7 is a perspective view of a spring plate according to the invention, used in the hinge of FIGS. 4–6.

Figure 1:
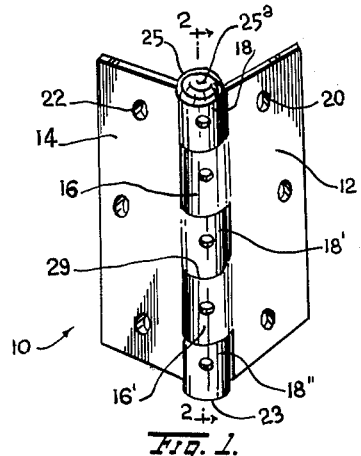
FIG. 1 is a side elevational view of a butt hinge embodying the invention.
Figure 2:
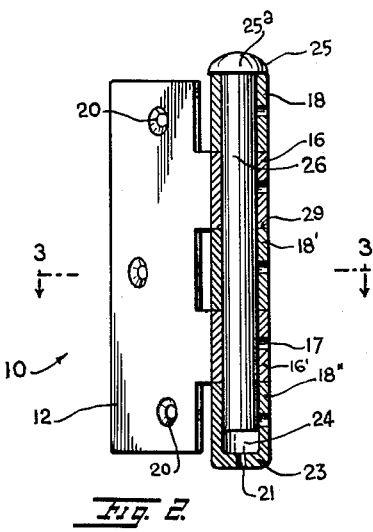
FIG. 2 is a longitudinal sectional view on an enlarged scale taken on line 2—2 of FIG. 1.
Figure 3:
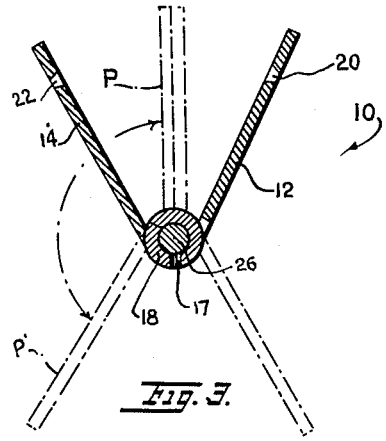
FIG. 3 is a transverse sectional view taken on line 3—3 of FIG. 2.

In FIGS. 1–3, the hinge 10 has two flat rectangular wing plates 12, 14. The plate 12 has two tubular eyes 16, 16' axially aligned with and interfitting with three smaller tubular eyes 18, 18' and 18'' of plate 14. Countersunk screw holes 20, 22 are provided on the respective plates. At the lower end of the hinge is an end wall 23 defining with the wall of eye 18'' a space 24 to hold grease. Holes 17 extend radially inward of the eyes respectively to receive grease or other lubricant. A hole 21 is formed axially in the bottom wall 23 through which grease or other lubricant can be passed into space 24. A pivot bolt 25 has its cylindrical shank 26 removably disposed in the axially aligned eyes. The bottom end of the shank terminates short of the end wall 23 of the hinge so that space 24 can be filled with lubricant. Head 25ª of bolt 25 bears on the upper end of eye 18.

During operation of the hinge the lubricant will gradually work its way around the shank of the bolt and between the abutting edges 29 of the eyes to provide smooth, easy opening and closing of the hinge between the dotted line positions P, P' indicated in FIG. 3.

In FIGS. 4–7, the hinge 10ª is similar to hinge 10 and corresponding parts are identically numbered. The eyes of the wing plates 12', 14, are formed with rectangular recesses 30. Each recess is formed with a transverse groove 33 in which engages a lip 34 formed at one end of a leaf spring 36. The spring, as clearly shown in FIGS. 4–7, has projection 37 pressed inwardly to engage in a conical hole 17ª formed in each of the eyes. The holes are disposed axially perpendicular to the aligned axes of the eyes. The lower end 38 of each leaf spring 36 is formed with a lip directed oppositely to lip 34. The recesses 30 extend below the lips 38. The lips 38 can be individually engaged by the pointed end of an oil can O or grease dispenser and the springs can be bent outwardly without disengaging lips 34 from the grooves 33 as shown at P'' in FIG. 5. The holes 17ª can thus be filled with lubricant without permanently displacing the springs. When the springs are released the projections 37 will reengage in the holes 17ª. These springs hold the lubricant in the holes and in addition exclude dirt, dust, and the like from the moving parts of the hinge. In FIG. 4, spring 36 is removed from eye 18.

Figure 8:
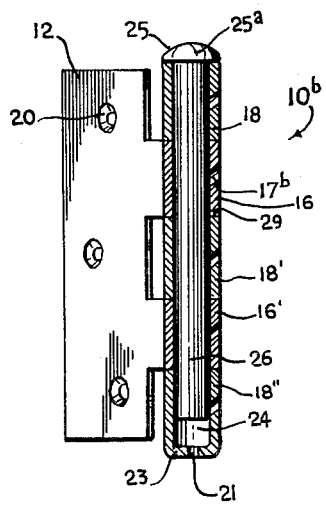
FIG. 8 is a sectional view similar to FIG. 2 showing a modified butt hinge construction.

In FIG. 8, the hinge 10ᵇ is similar to hinge 10 except that holes 17ᵇ in the eyes are axially inclined downwardly to the axes of the eyes to retain the lubricant more effectively in the holes than is possible with horizontal, radial holes 17.

Figure 9:
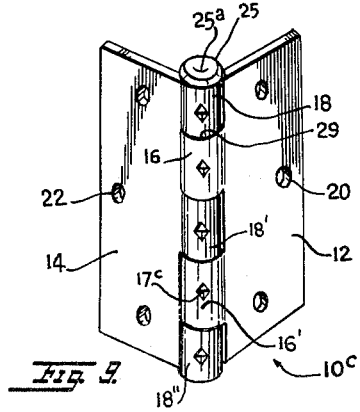
FIG. 9 is a side elevational view of another butt hinge showing still another modification.

In FIG. 9 the holes 17ᶜ of the eyes in hinge 10ᶜ are rectangular or noncircular. The sharp corners of the holes will retain the lubricant more effectively in the holes due to increased surface tension, than is possible with the round holes 17 of hinge 10. Hole 21 in end wall 23 can also be rectangular or noncircular.

The invention thus provides improved lubrication means for eyes of butt hinge plates. The holes 17, 17ª–17ᶜ can be formed prior to the formation of the eyes, simultaneously therewith, or can be drilled or punched after the hinge plates are formed. The invention is adaptable to existing hinge installations, and the holes can be formed without disturbing the hinge plates on the doors, windows or other members on which the hinge plates may be mounted.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A butt hinge construction, comprising a pair of flat wing plates having spaced tubular eyes at one lateral edge of each plate, the eyes of one plate interfitting and aligned axially with the eyes of the other plate, said eyes each having a hole therein extending inwardly from the outside of the eye to the interior thereof, each hole being located between opposite axial ends of the eye, a bolt having a cylindrical shank removably disposed in the tubular eyes, one eye of one plate having an end wall defining with the wall of the eye a space thereat, said shank terminating short of said end wall, said end wall having a narrow axial hole for passing lubricant into said space, each of the eyes having a generally rectangular recess formed in its outer side, each of the holes being substantially centrally disposed at and communicating with said recess, and a plurality of leaf springs each engaged at one end thereof in a different one of the recesses, each leaf spring having a projection disengageably held in one of the holes in the eyes for retaining lubricant therein and for excluding dirt and dust, each of the eyes having a transverse groove formed across the recess therein, each leaf spring having a lip at said one end thereof engaged in the transverse groove of its respective eye, each leaf spring having another lip at the other end thereof extending slightly outward of the recess in the eye for engagement by a portion of a lubrication dispensing device to bend the spring and retract the projection from the hole in the eye.

2. A butt hinge construction, comprising a pair of flat wing plates having spaced tubular eyes at one lateral edge of each plate, the eyes of one plate interfitting and aligned axially with the eyes of the other plate, said eyes each having a hole therein extending inwardly from the outside of the eye to the interior thereof, each hole being located between opposite axial ends of the eye, a bolt having a cylindrical shank removably disposed in the tubular eyes, one eye of one plate having an end wall defining with the wall of the eye a space thereat, said shank terminating short of said end wall, said end wall having a narrow axial hole for passing lubricant into said space, each of the eyes having a generally rectangular recess formed in its outer side, each of the holes being substantially centrally disposed at and communicating with said recess, and a plurality of leaf springs each engaged at one end thereof in a different one of the recesses, each leaf spring having a projection disengageably held in one of the holes in the eyes for retaining lubricant therein and for excluding dirt and dust, each of the eyes having a transverse groove formed across the recess therein, each leaf spring having a lip at said one end thereof engaged in the transverse groove of its respective eye, each leaf spring having another lip at the other end thereof extending slightly outward of the recess in the eye for engagement by a portion of a lubrication dispensing device to bend the spring and retract the projection from the hole in the eye.

References Cited by the Examiner
UNITED STATES PATENTS

| 132,147 | 10/72 | Dodge | 16—161 |
| 791,621 | 6/05 | Hocks | 16—161 |
| 2,135,723 | 11/38 | McCallum | 16—161 X |

FOREIGN PATENTS

| 407,010 | 12/09 | France. |
| 1,194,833 | 5/59 | France. |

DONLEY J. STOCKING, *Primary Examiner.*